(12) United States Patent
Lee et al.

(10) Patent No.: US 9,000,624 B2
(45) Date of Patent: Apr. 7, 2015

(54) POWER-GOOD SIGNAL GENERATOR AND CONTROLLER WITH POWER SEQUENCING FREE

(75) Inventors: Li-Min Lee, New Taipei (TW);
Zhong-Wei Liu, Wuxi (CN);
Chung-Che Yu, New Taipei (TW);
Shian-Sung Shiu, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 543 days.

(21) Appl. No.: 13/470,363

(22) Filed: May 14, 2012

(65) Prior Publication Data

US 2013/0175869 A1 Jul. 11, 2013

(30) Foreign Application Priority Data

Jan. 10, 2012 (TW) .............................. 101100986 A

(51) Int. Cl.
*H01H 7/00* (2006.01)
*H02J 4/00* (2006.01)

(52) U.S. Cl.
CPC ...................................... *H02J 4/00* (2013.01)

(58) Field of Classification Search
USPC ........................................................ 307/141
See application file for complete search history.

(56) References Cited

U.S. PATENT DOCUMENTS 6,204,706 B1 * 3/2001 Horvath ........................ 327/198

* cited by examiner

*Primary Examiner* — Robert L. Deberadinis
(74) *Attorney, Agent, or Firm* — CKC & Partners Co., Ltd.

(57) ABSTRACT

A power-good signal generator generates a power-good signal according to a control signal of a controller, and comprises an impedance element, a controlled transistor and a power sequencing free circuit. An end of the impedance element is coupled to a second voltage source. The controlled transistor has first and second input/output ends and a controlled end, wherein the first input/output end is coupled to the other end of the impedance element to generate the power-good signal. An operating state of the controlled transistor is changed in response to the control signal. The power sequencing free circuit is coupled to the controlled end and one of the first input/output end and the second voltage source. When the second voltage source is supplied before the first voltage source, the power sequencing free circuit turns on the controlled transistor to clamp the power-good signal to be lower than a predetermined voltage level.

12 Claims, 2 Drawing Sheets

POWER-GOOD SIGNAL GENERATOR AND CONTROLLER WITH POWER SEQUENCING FREE

RELATED APPLICATIONS

This application claims priority to Taiwan Application Serial Number 101100986, filed Jan. 10, 2012, which is herein incorporated by reference.

BACKGROUND

1. Field of the Invention

The present invention relates to a power-good signal generator and a controller with power sequencing free.

2. Description of Related Art

Some of power-control integrated circuits have to monitor whether the output voltage is normal or not in the field of power management IC (integrated circuit) design. A power-good pin of a power management IC may provide a power-good signal when the output voltage is normal, such that the system may judge or proceed with the power-good signal. Especially in a complex system, such as a computer, a power sequencing and a restarting sequencing of the system have to be executed in a default sequence. FIG. 1 is a schematic diagram showing a power-good signal PG being used as a starting signal EN for a controller of a next stage system. Therefore, the controller of the next stage system can be prevented from being operated before the output voltage controlled by the power management IC is supplied stably. FIG. 2 is a schematic diagram showing a power-good signal modulated to be a starting signal EN for a controller of a next stage system. It is necessary that a phase and a level of the power-good signal PG are modulated suitably by a level shifter circuit between the adjacent stage systems as the starting signal EN of the next stage system. FIG. 3 is a schematic diagram showing a conventional level shifter circuit. The power-good signal PG is used to control a transistor M1 after being filtered and delayed by a resistance R1 and a capacitance C1. The transistor M1 is connected to a resistance R2 in series, and a transistor M2 is connected to a resistance R3 in series, and a connection node of the transistor M1 and the resistance R2 is connected to a gate of transistor M2. When the power-good signal PG is at a high level for a period of time, a voltage across the capacitance C1 is increased to turn on the transistor M1. At this time, the transistor M2 is turned off, so that the starting signal EN is at a high level.

In general, the power management IC does not have sufficient driving capability, and thus it cannot be ensured that the power management IC may drive the next stage circuit exactly and properly. Therefore, the power management IC may increase the driving capability of the power-good signal PG by using a power-good signal generator. FIG. 4 (a) is a schematic diagram showing a conventional power-good signal generator. The power-good signal generator comprises a resistance R4 and a transistor M5 connected in series, and the transistor M5 is controlled by a controller 10. The controller 10 is coupled to a first voltage source VDD to receive electric power for operating and turns off the transistor M5 when an output voltage of a converting circuit (not shown) controlled by the controller 10 reaches a predetermined potential. An end of the transistor R4 is coupled to a second voltage source VX, and the other end thereof is coupled to a drain of the transistor M5. A source of the transistor M5 is grounded and a gate thereof is coupled to the controller 10. The power-good signal generator generates the power-good signal PG at a connection node of the resistance R4 and the transistor M5 when the transistor M5 is turned off. The power-good signal generator may generate the power-good signal PG incorrectly when the first voltage source VDD and the second voltage source VX are provided in undesired sequence. FIG. 4 (b) is waveform diagram regarding the power-good signal generator shown in FIG. 4 (a) when a first voltage source VDD is provided after a second voltage source VX. The second voltage source VX is provided at time point t1, and the first voltage source VDD is provided later. At the time point t2, the voltage of the first voltage source VDD is increased to be enough to enable the controller 10 to turn on the transistor M5. Between the time points t1 and t2, the transistor M5 is turned off and thus the level of the power-good signal PG is increased with the voltage increase of the second voltage source VX until the transistor M5 is turned on at the time point t2. Namely, the power-good signal generator incorrectly generates the power-good signal PG. At the time point t3, the controller 10 determines that the output voltage of the converting circuit reaches the predetermined potential and then turns off the transistor M5 to output the power-good signal PG. The power-good signal PG incorrectly generated between the time points t1 and t2 may cause the next stage circuit to be started/operated incorrectly according to the power-good signal PG.

SUMMARY

The incorrect power-good signal may be generated due to the undesired power sequence. The present invention uses a power-good signal generator with power sequencing free or a logic circuit of a controller having dual powers to avoid incorrectly generating a power-good signal before an operating voltage for the controller is supplied.

To accomplish the aforementioned and other objects, an exemplary embodiment of the invention provides a power-good signal generator with power sequencing free. The power-good generator with power sequencing free generates a power-good signal according to a control signal of a controller, wherein an input power terminal of the controller is coupled to a first voltage source. The power-good signal generator comprises an impedance element, a controlled transistor and a power sequencing free circuit. An end of the impedance element is coupled to a second voltage source. The controlled transistor has a first input/output end, a second input/output end and a controlled end, wherein the first input/output end thereof is coupled to the other end of the impedance element to generate the power-good signal, and the second input/output end thereof is coupled to a common potential, and the controlled end thereof is coupled to the controller. An operating state of the controlled transistor is changed in response to the control signal of the controller. The power sequencing free circuit is coupled to the controlled end of the controlled transistor and one of the first input/output end of the controlled transistor and the second voltage source. When the second voltage source is supplied before the first voltage source is supplied, the power sequencing free circuit turns on the controlled transistor to clamp a voltage level of the power-good signal to be lower than a predetermined voltage level.

An exemplary embodiment of the invention also provides a power-good signal generator with power sequencing free. The power-good signal generator with power sequencing free generates a power-good signal according to a control signal of a controller. An input power terminal of the controller is coupled to a first voltage source. The power-good signal generator comprises a controlled transistor, an impedance element and a power sequencing free circuit. An operating state of the controlled transistor is changed in response to the control signal of the controller. The controlled transistor has a first input/output end, a second input/output end and a controlled end, wherein the first input/output end thereof is coupled to a second voltage source. An end of the impedance element is coupled to the second input/output end of the controlled transistor to generate the power-good signal and the other end thereof is coupled to a common potential. The power sequencing free circuit is coupled to the controlled end of the controlled transistor and is coupled to one of the second input/output end of the controlled transistor and the common potential. When the second voltage source is provided before the first voltage source provided, the power sequencing free circuit turns off the controlled transistor.

An exemplary embodiment of the invention further provides a controller with power sequencing free. The controller with power sequencing free controls a power-good signal generator to generate a power-good signal when an output voltage of a converting circuit controlled by the controller reaches a predetermined value. The controller comprises a first logic circuit and a second logic circuit. The first logic circuit is coupled to a first voltage source, and the second logic circuit is coupled to a second voltage source. A second output end of the second logic circuit is coupled to a first output end of the first logic circuit. The first logic circuit outputs a signal at the first output end when the first voltage source is provided and the output voltage reaches the predetermined value, and the second logic circuit outputs a signal at the second output end when the second voltage source is provided and the output voltage reaches the predetermined value, thereby enabling the first logic circuit and the second logic circuit to jointly generate a control signal to control the converting circuit.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which:

FIG. 4 (b) is waveform diagram regarding the power-good signal generator shown in FIG. 4 (a) when a first voltage is provided after a second voltage;

FIG. 5 (b) is a schematic diagram showing a power-good signal generator with power sequencing free according to a second embodiment of the present embodiment;

FIG. 5 (c) is a schematic diagram showing a power-good signal generator with power sequencing free according to a third embodiment of the present embodiment;

FIG. 5 (d) is a schematic diagram showing a power-good signal generator with power sequencing free according to a fourth embodiment of the present embodiment; and FIG. 5 (e) is a schematic diagram showing a power-good signal generator with power sequencing free according to a fifth embodiment of the present embodiment.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
FIG. 1 is a schematic diagram showing a power-good signal being used as a starting signal for a controller of a next stage system.
Figure 2:
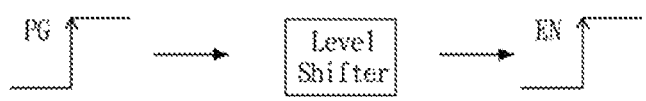
FIG. 2 is a schematic diagram showing a power-good signal modulated to be a starting signal for a controller of a next stage controller.
Figure 3:
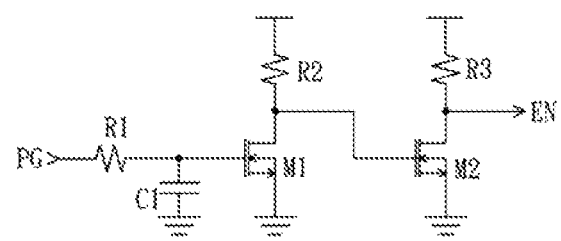
FIG. 3 is a schematic diagram showing a conventional level shifter circuit.
Figure 4:
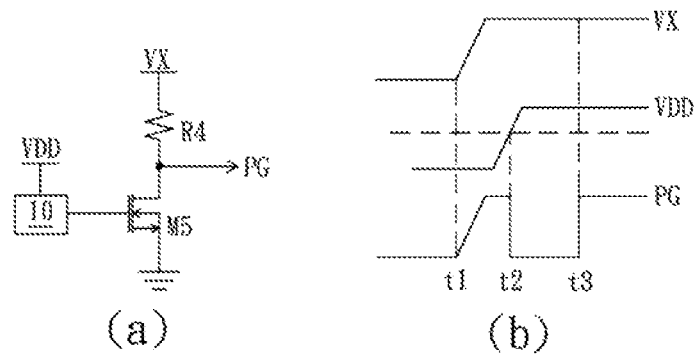
FIG. 4 (a) is a schematic diagram showing a conventional power-good signal generator.
Figure 5:
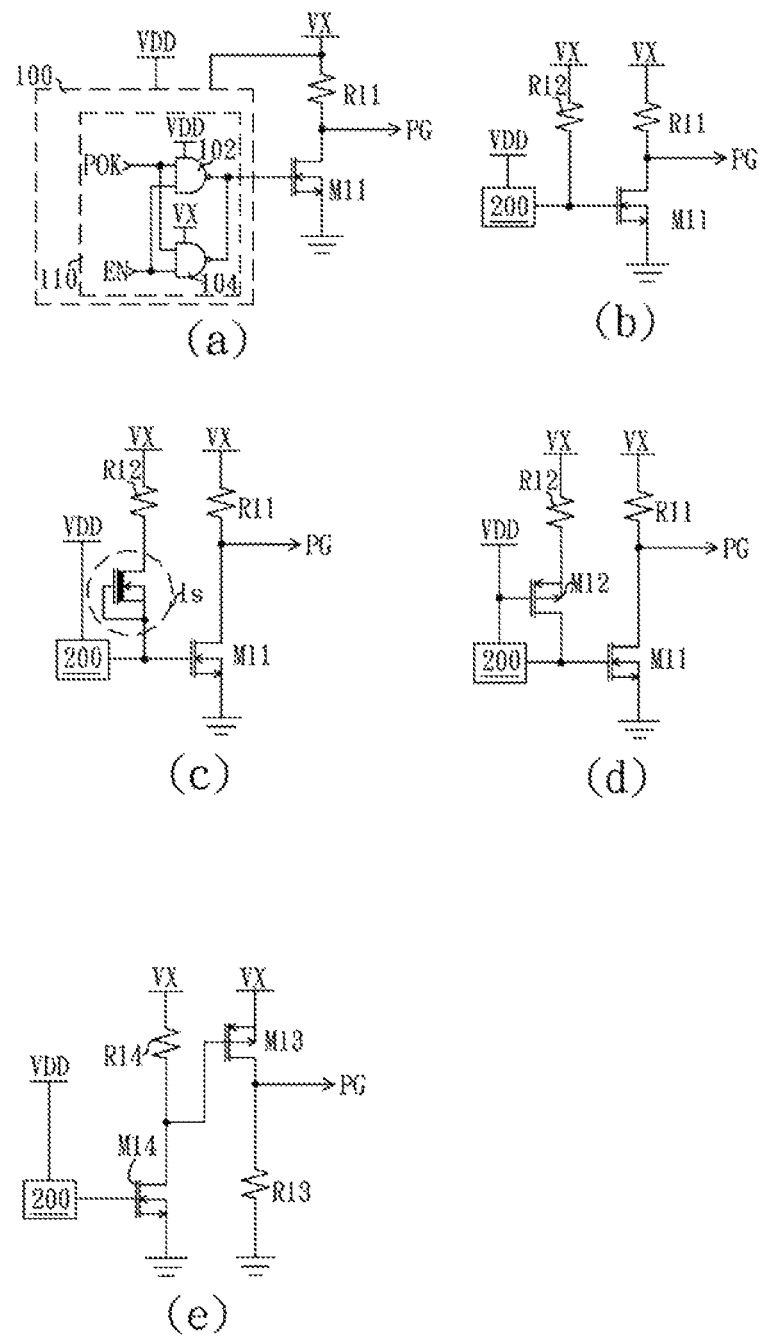
FIG. 5 (a) is a schematic diagram showing a controller with power sequencing free according to a first embodiment of the present embodiment.

FIG. 5 (a) is a schematic diagram showing a controller 100 with power sequencing free according to a first embodiment of the present embodiment. The controller 100 generates a control signal to enable a power-good signal generator to generate a power-good signal PG when it is detected that an output voltage of a converting circuit (not shown) controlled by the controller 100 reaches a predetermined voltage. The controller 100 comprises a first logic circuit 102 and second logic circuit 104. The first logic circuit 102 is coupled to a first voltage source VDD, and the second logic circuit 104 is coupled to a second voltage source VX. An output end of the first logic circuit 102 and an output end of the second logic circuit 104 are mutually coupled to generate the control signal. In the present embodiment, the first logic circuit 102 and the second logic circuit 104 are NAND gates. When the first voltage source VDD or the second voltage source VX is provided, the corresponding one of the output ends of the first logic circuit 102 and the second logic circuit 104 is operated well to control the power-good signal generator correctly. The first logic circuit 102 and the second logic circuit 104 may receive an output judgment signal POK which is used to judge whether the output voltage provided by the converting circuit is ready and a starting signal EN which is used to activate the controller 100.

The power-good signal generator comprises an impedance element R11 and a controlled transistor M11. An end of the impedance element R11 is coupled to the second voltage source VX. The controlled transistor M11 has a first input/output end (drain), a second input/output end (source) and a controlled end (gate). The first input/output end of the controlled transistor M11 is coupled to the other end of the impedance element R11 to generate the power-good signal PG, and the second input/output end thereof is coupled to a common potential, e.g., the ground. The controlled end of the controlled transistor M11 is coupled to the controller 100, thereby changing an operating state of the controlled transistor M11 according to the control signal. When all of the output judgment signal POK, the starting signal EN, the first voltage source VDD and the second voltage source VX exist, the controller 100 turns off the controlled transistor M11, and thus the power-good signal generator generates the power-good signal PG. When the second voltage source VX is provided before the first voltage source VDD, the main circuit (the electric power for operation is provided by the first voltage source VDD) of the controller 100 is not operated, and thus the output voltage of the converting circuit is not provided. The output judgment signal POK is at a low level to represent that the output voltage of the converting circuit is not ready. The second logic circuit 104 outputs a high level signal to turn on the controlled transistor M11 to ensure the power-good signal generator to stop generating the power-good signal PG, and thus the power-good signal PG is at a low level.

FIG. 5 (b) is a schematic diagram showing a power-good signal generator with power sequencing free according to a second embodiment of the present embodiment. The power-good signal generator with power sequencing free comprises an impedance element R11, a controlled transistor M11 and a power sequencing free circuit. The power-good signal generator with power sequencing free generates a power-good signal PG according to a control signal of a controller 200. An input power terminal of the controller 200 is coupled to a first voltage source VDD to receive electric power for operation. The connections of the impedance element R11 and the controlled transistor M11 can be referred to the corresponding description in FIG. 5 (a), and thus are not described again herein. The power sequencing free circuit comprises a resistance R12 which is coupled to the controlled end of the controlled transistor M11 and the second voltage source VX. If the second voltage source VX is provided before the first voltage source VDD, the controller 200 is not operated and thus cannot turn on the controlled transistor M11. At this time, the resistance R12 increases the level of the controlled end of the controlled transistor M11 with the increasing voltage of the second voltage source VX so as to turn on the controlled transistor M11. Therefore, the level of the power-good signal PG is substantially equal to zero. The resistance value of the resistance R12 is higher, and thus the controller 200 is capable of pulling down the potential level of the controlled end of the controlled transistor M11 when the controller 200 is operated and detects that the output voltage of the converting circuit reaches a predetermined value. At this time, the controlled transistor M11 is turned off, and thus the impedance element R11 pull up the level of the connection node of the impedance element R11 and the controlled transistor M11 to generate the power-good signal PG.

FIG. 5 (c) is a schematic diagram showing a power-good signal generator with power sequencing free according to a third embodiment of the present embodiment. Compared to the circuit shown in FIG. 5 (b), the power sequencing free circuit adds a current source Is coupled between the resistance R12 and the controlled end of the controlled transistor M11 to provide a current flowing through the resistance R12 in the present embodiment. The current source Is may be a depletion mode transistor, wherein a first end (drain) thereof is coupled to the resistance R12, and a second end (source) thereof is coupled to the controlled end of the controlled transistor M11, and a controlled end (gate) thereof is coupled to the second end thereof. Besides, the base of the depletion mode transistor may be connected to the source or grounded. When the second voltage source VX is provided before the first voltage source VDD, the current source Is charges the controlled end of the transistor M11 to turn on the controlled transistor M11. The level of the power-good signal PG is substantially equal to zero. The resistance R12 can protect the current source Is from electrostatic discharging. The driving capability of the controller 200 is better than that of the current source Is. When the output voltage of the converting circuit reaches a predetermined value, the controller 200 provides a discharging current which is higher than the charging current provided by the current source Is to decrease the level of the controlled end of the controlled transistor M11, and thus the controlled transistor M11 is turned off to generate the power-good signal PG which is pulled up by the impedance element R11.

FIG. 5 (d) is a schematic diagram showing a power-good signal generator with power sequencing free according to a fourth embodiment of the present embodiment. Compared to the circuit shown in FIG. 5 (b), a transistor M12 coupled between the resistance R12 and the controlled end of the controlled transistor M11 is added to the power sequencing free circuit. In the present embodiment, the transistor M12 is a P-type transistor, in which a first end (source) thereof is coupled to the resistance R12, and a second end (drain) thereof is coupled to the controlled end of the controlled transistor M11, and a controlled end (gate) thereof is coupled to a first voltage source VDD. When the second voltage source VX is provided before the first voltage source VDD, the voltage level of the controlled end of the transistor M12 is still at a low level, and thus the transistor M12 is turned on to increase the voltage level of the controlled end of the controlled transistor M11. Therefore, the controlled transistor M11 is turned on, and thus the level of the power-good signal PG is substantially equal to zero. When the first voltage source VDD is also provided, the level of the controlled end of the transistor M12 is increased and thus the transistor M12 is turned off. The controller 200 starts to be operated and directly controls the transistor M11 to be turned on/off in response to the output voltage of the converting circuit.

In the foregoing present embodiment, the resistance R12 can be coupled to the connection node of the impedance element R11 and the controlled transistor M11 to replace the second voltage source VX to provide a different level of the power-good signal PG for different application condition.

Beside, the impedance element R11 and the controlled transistor M11 may be exchanged. FIG. 5 (e) is a schematic diagram showing a power-good signal generator with power sequencing free according to a fifth embodiment of the present embodiment. The power-good signal generator with power sequencing free comprises an impedance element R13, a controlled transistor M13 and a power sequencing free circuit. The power-good signal generator generates a power-good signal PG in response to a control signal of a controller 200. An input power terminal of the controller 200 is coupled to a first voltage source VDD to receive electric power for operation. The controlled transistor M13 is turned on or off via the power sequencing free circuit according to the control signal of the controller 200. The controlled transistor M13 has a first input/output end (source), a second input/output end (drain) and a controlled end (gate), wherein the first input/output end thereof is coupled to a second voltage source VX. An end of the impedance element R13 is coupled to the second input/output end of the controlled transistor M13 to generate the power-good signal PG, and the other end of the impedance element R13 is coupled to a common potential. The power-good signal generator comprises a resistance R14 and a transistor M14. One end of the resistance R14 is coupled to the second voltage source VX, and the other end thereof is coupled to the controlled end of the controlled transistor M13 and a first end (drain) of the transistor M14. A second end (source) of the transistor M14 is coupled to a common potential, and a controlled end thereof is coupled to the controller 200 for receiving the control signal generated by the controller 200. When the second voltage source VX is provided but the first voltage source VDD is not provided, the transistor M14 is turned off. The controlled transistor M13 is also turned off due to the resistance R14, and thus the level of the power-good signal PG is maintained at a low level. The second end of the transistor M14 can be also coupled to the second input/output end of the controlled transistor M13 to provide the power-good signal PG with a different voltage level.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A power-good signal generator with power sequencing free for generating a power-good signal according to a control signal of a controller, wherein an input power terminal of the controller is coupled to a first voltage source, the power-good signal generator comprising:
   an impedance element of which an end is coupled to a second voltage source;
   a controlled transistor having a first input/output end coupled to the other end of the impedance element to generate the power-good signal, a second input/output end coupled a common potential and a controlled end coupled to the controller, wherein an operating state of the controlled transistor is changed in response to the control signal of the controller; and
   a power sequencing free circuit coupled to the controlled end of the controlled transistor and one of the first input/output end of the controlled transistor and the second voltage source;
   wherein when the second voltage source is provided before the first voltage source is provided, the power sequencing free circuit turns on the controlled transistor to clamp a voltage level of the power-good signal to be lower than a predetermined voltage level.

2. The power-good signal generator according to claim 1, wherein the power sequencing free circuit further comprises a depletion mode transistor, a first end of the depletion mode transistor is coupled to the first input/output end of the controlled transistor, a second end of the depletion mode transistor is coupled to the controlled of the controlled transistor and a controlled of the depletion mode transistor is coupled to the second end of the depletion mode transistor.

3. The power-good signal generator with power sequencing free according to claim 1, wherein the power sequencing free circuit further comprises a P-type transistor, and a first end of the P-type transistor is coupled to the first input/output end of the controlled transistor, and a second end of the P-type transistor is coupled to the controlled end of the controlled transistor, and a controlled end of the P-type transistor is coupled to the first voltage source.

4. The power-good signal generator according to claim 1, wherein the power sequencing free circuit comprises a resistance, and an end of the resistance is coupled to one of the first input/output end of the controlled transistor and the second input end, and the other end of the resistance is coupled to the controlled end of the controlled transistor.

5. The power-good signal generator according to claim 4, wherein the power sequencing free circuit further comprises a depletion mode transistor, and a first end of the depletion mode transistor is coupled to the first input/output end of the controlled transistor, and a second end of the depletion mode transistor is coupled to the controlled of the controlled transistor, and a controlled of the depletion mode transistor is coupled to the second end of the depletion mode transistor.

6. The power-good signal generator according to claim 4, wherein the power sequencing free circuit further comprises a P-type transistor, and a first end of the P-type transistor is coupled to the first input/output end of the controlled transistor, and a second end of the P-type transistor is coupled to the controlled end of the controlled transistor, and a controlled end of the P-type transistor is coupled to the first voltage source.

7. A controller with power sequencing free adapted to control a power-good signal generator to generate a power-good signal when an output voltage of a converting circuit controlled by the controller reaches a predetermined value, the controller comprising:
   a first logic circuit coupled to a first voltage source; and
   a second logic circuit coupled to a second voltage source, in which a second output end of the second logic circuit is coupled to an first output end of the first logic circuit;
   wherein the first logic circuit outputs a signal at the first output end when the first voltage source is provided and the output voltage reaches the predetermined value, and the second logic circuit outputs a signal at the second output end when the second voltage source is provided and the output voltage reaches the predetermined value, thereby enabling the first logic circuit and the second logic circuit to jointly generate a control signal to control the converting circuit.

8. The controller according to claim 7, wherein the first logic circuit and the second logic circuit are NAND gates.

9. A power-good signal generator with power sequencing free for generating a power-good signal according to a control signal of a controller, wherein an input power terminal of the controller is coupled to a first voltage source, the power-good signal generator comprising:
   a controlled transistor of which an operating state is changed in response to the control signal of a controller, the controlled transistor having a first input/output end coupled to a second voltage source, a second input/output end and a controlled end;
   an impedance element, wherein an end of the impedance element is coupled to the second input/output end of the controlled transistor to generate the power-good signal, and the other end of the impedance element is coupled to a common potential; and
   a power sequencing free circuit coupled to the controlled end of the controlled transistor and one of the second input/output end of the controlled transistor and the common potential;
   wherein when the second voltage source is provided before the first voltage source is provide, the power sequencing free circuit turns off the controlled transistor.

10. The power-good signal generator according to claim 9, wherein the power sequencing free circuit comprises a transistor, wherein a first end of the transistor is coupled to the controlled end of the controlled transistor, and a second end of the transistor is coupled one of the second input/output end of the controlled transistor and the common potential, and a controlled end of the transistor is coupled to the controller.

11. The power-good signal generator according to claim 9, wherein the power sequencing free circuit comprises a resistance, wherein an end of the resistance is coupled to the second voltage source, and the other end of the resistance is coupled to the controlled end of the controlled transistor.

12. The power-good signal generator according to claim 11, wherein the power sequencing free circuit further comprises a transistor, and a first end of the transistor is coupled to the controlled end of the controlled transistor, and a second end of the transistor is coupled one of the second input/output end of the controlled transistor and the common potential, and a controlled end of the transistor is coupled to the controller.

* * * * *